United States Patent [19]
Yee et al.

[11] Patent Number: 5,750,177
[45] Date of Patent: May 12, 1998

[54] CHEESE WITH IMPROVED MELT PROPERTIES AND METHODS OF PRODUCING SAME

[75] Inventors: Jeng-Jung Yee; Lawrence I. Bell; Raj G. Narasimmon, all of Green Bay, Wis.

[73] Assignee: Schreiber Foods, Inc., Green Bay, Wis.

[21] Appl. No.: 970,696

[22] Filed: Nov. 4, 1992

[51] Int. Cl.$^6$ ................................................. A23C 19/084
[52] U.S. Cl. ............................ 426/582; 426/520; 426/583
[58] Field of Search .................................... 426/582, 520, 426/583

[56] References Cited

U.S. PATENT DOCUMENTS

| | | |
|---|---|---|
| 1,323,869 | 12/1919 | Kraft . |
| 2,743,186 | 4/1956 | Kraft et al. . |
| 3,046,140 | 7/1962 | Hermann . |
| 3,881,035 | 4/1975 | Tate . |
| 4,185,126 | 1/1980 | Spors . |
| 4,188,411 | 2/1980 | Kulpers et al. ................... 426/582 |
| 4,205,090 | 5/1980 | Maubois et al. . |
| 4,299,855 | 11/1981 | Wada et al. . |
| 4,401,679 | 8/1983 | Rubin et al. . |
| 4,713,254 | 12/1987 | Childs et al. ...................... 426/582 |
| 4,820,530 | 4/1989 | Moran et al. . |
| 4,885,183 | 12/1989 | Strandholm et al. . |
| 4,919,943 | 4/1990 | Yee et al. . |
| 5,037,659 | 8/1991 | Trecker et al. . |
| 5,165,945 | 11/1992 | Yee et al. . |

FOREIGN PATENT DOCUMENTS

| | | |
|---|---|---|
| 0 065 981 | 6/1982 | European Pat. Off. . |
| 0 174 846 | 3/1986 | European Pat. Off. . |
| 0 174 847 | 3/1986 | European Pat. Off. . |

OTHER PUBLICATIONS

Article entitled "Cheese Base for Processing. A High Yield Product from Whole Milk by Ultrafiltration," 1980 J. Dairy Sci. 63:228–234.

"Update of UF Cheesemaking—What Has and Hasn't Worked," by Karsten Bruun Qvist, *Proceedings*, CDR Annual Conference: Cheese Research and Technology, Mar. 29–30, 1989.

Japanese article entitled, "Functional Properties of Cheese Cooked without Emulsifying Salts in a Twin Screw Extruder," by the Technical Research Institute, Snow Brand Milk Products, Co., Ltd. (undated).

T. Friis, "Production of Mozzarella Cheese based on Ultrafiltration," North European Dairy Journal, Nov. 1981, pp. 220–223.

R. Hansen, "Mozzarella Cheese without Whey Proteins," North European Dairy Journal, Mar. 1987, pp. 21–23.

*Primary Examiner*—Helen Pratt
*Attorney, Agent, or Firm*—Steven P. Shurtz; Brinks Hofer Gilson & Lione

[57] ABSTRACT

A cheese that contains high levels of whey proteins, is free of emulsifying agents, and yet has good melt properties is disclosed. The cheese may be made from 100% UF cheese, containing most and preferably all of the whey proteins from milk, or from a blend of UF and conventional cheese. The preferred process of the present invention involves heating the cheese to a temperature of above 125° F., and preferably below 165° F., mixing the cheese in the absence of emulsifying agents and using low levels of shear, and rapidly cooling the heated, mixed cheese. A variety of full fat, low fat and zero fat natural cheeses equivalent to comparable conventional cheeses, including American-type cheeses, can be made. The cheeses have a Schreiber melt test score of 3 or above and a Mettler melt temperature of less than 200° F.

38 Claims, 4 Drawing Sheets

10 μm

10 μm

10 μm

10 μm

CHEESE WITH IMPROVED MELT PROPERTIES AND METHODS OF PRODUCING SAME

BACKGROUND OF THE INVENTION

The present invention relates to cheese and improving its melt properties, more particularly the invention relates to cheese with high levels of whey proteins but which has good melt properties, and methods of producing such cheese.

In recent years the dairy industry has tried to increase the yield of cheese making processes by recovering the whey proteins normally lost when whey is drained from a milk coagulum that is cut and cooked to form cheese curd. Milk has a whey proteins to casein ratio of about 1:4. However, by the time the whey is drained, the resulting cheese has a whey proteins to casein ratio of less than about 1:40. Some processes have included steps to recover the whey proteins from the whey and combine them with the cheese. For various reasons, such as government food laws and functional characteristics, whey proteins recovered from whey are not used to any significant extent in commercial processes for making conventional natural cheese or pasteurized process cheese.

A further approach for increasing the yields of cheese making processes by utilization of the whey proteins is by ultrafiltration of milk. It has previously been proposed to produce products suitable for conversion into cheese by altering the composition of whole or skim milk utilizing ultrafiltration (UF) or reverse osmosis. The milk is contacted with a UF membrane which permits the passage of water, lactose, and some minerals, but prevents the passage of casein, the whey proteins, butterfat and some minerals. The selective concentration of milk results in the formation of a retentate that contains both casein and whey proteins, in the same ratio as in the milk. When the retentate is coagulated by acid or rennet, it forms a coagulum that contains the whey proteins. If this coagulum is then subject to syneresis, some of the whey proteins are lost in the expressed whey, but not to the extent the whey proteins are lost in a conventional cheese process. One method for producing cheese by ultrafiltration of milk is disclosed in U.S. Pat. No. 4,205,090 (Maubois, et al.). According to this method, whole or skim milk is concentrated by ultrafiltration to about one fifth of its original volume to give a product, sometimes called a "liquid pre-cheese", which is then manufactured by conventional means to give cheese. This method, however, is only suitable for making soft cheeses of the Camembert or Reblochon type, and possibly some semi-soft cheeses. It cannot be used to produce harder cheese of the Cheddar, Colby, or stirred curd type, because the water content of the pre-cheese is too high.

In 1980 C. A. Ernstrom, B. J. Sutherland and G. W. Jameson published an article entitled "Cheese Base for Processing. A High Yield Product from Whole Milk by Ultrafiltration" in the *Journal of Dairy Science*, Vol. 63, pages 228–234. In the process described in this article, the moisture content and pH of the final product is controlled to any desired level. The process results in a cheese base which has a moisture content and pH appropriate for use in place of conventionally made natural cheeses in the production of processed cheeses. In the Ernstrom, et al. process, whole milk of normal pH, or acidified to pH 5.7, is concentrated by ultrafiltration to 40% of the original milk weight and diafiltered at a constant volume until the desired ratio of lactose to buffer capacity is established. The retentate is further concentrated by ultrafiltration to 20% of the original milk weight. The retentate is then inoculated with cheese starter and incubated to completely ferment the residual lactose. Precise control of final pH is achieved by controlling the level of lactose through diafiltration.

The fermented retentate is converted in a batch manner to cheese base in a swept-surface vacuum pan evaporator. The cheese base can be used to replace the unripened natural cheese component of processed cheese because it has the same pH and gross composition as Cheddar cheese. The use of the batch evaporator is necessitated by the fact that the retentate forms an acid curd or coagulum upon fermentation. Such a product cannot be readily processed in any continuous flow evaporator. Accordingly, the overall process of Ernstrom, et al. is essentially a batch process.

Subsequently, Jameson and Sutherland devised a continuous process for making cheese containing case-in and whey proteins. This process has been commercialized by Schreiber Foods, Inc. It is described in European Patent Specification No. 0 065 981 published on Aug. 12, 1982. In the Jameson et al. process, the ionic strength of the milk is increased so as to maintain the milk in the liquid state and to prevent the formation of any coagulum. The process includes the steps of selectively concentrating milk, fermenting the retentate to produce a product having the solids composition as desired in cheese and containing substantially all of the casein and whey proteins that were originally present in the milk, and removing water from the product to achieve the desired moisture content. As discussed on page 12, lines 43–47 of the EPO Patent, the process includes the optional step of treating the fermented retentate with rennet, but the amount of rennet suggested is insufficient to form a coagulum.

This process has been commercially used by Schreiber, which then uses the UF cheese to make processed cheese by mixing UF cheese and conventional cheese at a ratio of up to 75% UF cheese, about 1.5%–3% emulsifying agents and other typical processed cheese ingredients.

Another process developed by Pasilac A/S for making cheese that incorporates whey proteins by ultrafiltration is described in U.S. Pat. No. 4,401,679 to Rubin et al. This process includes the ultrafiltration and diafiltration of milk, followed by inoculating the retentate with culture prior to evaporation and the subsequent fermentation of the cheese to a lower pH finished product. The evaporation of the retentate takes place at a relatively high pH. The process does not involve treatment by a milk clotting enzyme (such as rennet), and hence the casein is not converted to paracasein.

European Patent Application 0 174 847 published Mar. 19, 1986 describes another approach to making cheese which includes whey proteins. The milk is converted by ultrafiltration and diafiltration into a retentate. The retentate is fermented without coagulation and contacted with a non-coagulating amount of milk clotting enzyme. The retentate is evaporated to produce pre-cheese, which is then held at curing conditions to convert more than 65% of kappa casein to para kappa casein. The cured pre-cheese is texturized by mechanical working of the pre-cheese to produce cheese having acceptable texture. This texturization step can not take place until at least about 65% of the available kappa casein is converted to para kappa casein. This conversion is effected in about 3 days to 14 days after the pre-cheese is removed out of the evaporator. Therefore, the process is inefficient. The process is said to be capable of producing cheese having over 60% solids by weight.

European Patent Application No. 0 174 846 published Mar. 19, 1986 and U.S. Pat. No. 4,820,530 describe a similar process except that the fermented retentate is maintained in a quiescent state during evaporation. The process is said to be capable of producing a cheese curd having a solids content of more than about 50 percent by weight. This process is inefficient for the same reason in that it requires conversion of at least 65% of kappa casein to para kappa casein, which requires from 3 to 14 days. Additionally, to achieve the well knitted texture, the cheese curd has to be pressed overnight and maintained in a 45° F. cooler for about 10 days.

U.S. Pat. No. 5,165,945, incorporated hereby by reference, discloses a process and system capable of producing cheeses with varied textures and having a solids content (in excess of about 70 weight percent) in a continuous manner. The cheeses include high levels of soluble proteins, such as whey proteins. In a preferred process, milk is treated by ultrafiltration and diafiltration to produce a retentate containing the desired cheese ingredients. Milk clotting enzymes are introduced to the retentate, including unrenneted casein and whey proteins, and the mixture is held for a time period needed for enzymatic reaction. The enzyme-treated retentate is then heated. The degree of enzyme action and heat treatment to which the retentate is subjected are selected to produce the desired body, texture, and solids level in the resulting cheese. Next, cultures are added to the thus treated retentate and excess water is removed to make unfermented cheese. This unfermented cheese is then allowed to ferment to produce fermented cheese generally having a pH of less than about 5.5.

Another UF cheese making process is disclosed in U.S. Pat. No. 5,037,659 to Trecker et al. The product is a low fat cheese. A lactic acid-producing culture and a coagulating enzyme are added to a retentate. The retentate is fermented while being agitated to prevent formation of a coagulum. The fermented retentate is then evaporated under turbulent conditions to provide a low-fat cheese with at least 50% solids.

A survey of some of the above and a number of other cheese making processes using ultrafiltration is provided in an article entitled "Update on UF Cheesemaking—What Has and Hasn't Worked" by K. B. Qvist, Center for Dairy Research, University of Wisconsin, Proceedings Mar. 29–30, 1989, pages 73–83.

One of the well known problems with cheese made by ultrafiltration, and hence containing high levels of whey proteins, is the poor melt properties of the cheese. On page 78, the Qvist document states, "It is an unfortunate fact that cheese made from UF-concentrated milk has impaired stretching and melting properties compared to traditional cheese . . . , the difference becoming progressively larger as the degree of concentration is increased."

Correct melt properties are essential for many uses of cheese. For example, a process developed by Pasilac Inc. for making Mozzarella that incorporates whey proteins by ultrafiltration is described in North European Dairy Journal (November, 1981) pages 220–223. The Pasilac process was claimed to increase the yield by about 18 percent over the traditional Mozzarella making processes due to the recovery of whey proteins. However, attempts to commercialize the Pasilac process in the United States have failed because the process could not produce a product that would meet the necessary functional characteristics of Mozzarella cheese. Specifically, the Pasilac cheese did not possess the necessary melt and stretch characteristics.

Another process using ultrafiltration of milk in the manufacture of Mozzarella incorporating whey proteins was attempted and failed commercially in Denmark. As reported in North European Dairy Journal (March 1987), pages 21–23, the Vesthimmerland dairy installed a mechanized ultrafiltration plant for the production of Mozzarella having a capacity of 5 tons per day. The cheese produced by this process did not meet the necessary functional characteristic for use on pizza, and the plant had to be converted back to produce traditional Mozzarella without whey proteins.

Two of the present inventors developed a process for making a pasta filata-type cheese containing high levels of whey proteins that has acceptable melt properties The process, disclosed in U.S. Pat. No. 4,919,943, requires separation of the whey proteins from casein and denaturing them to make them less reactive to casein, then combining them back with the casein before making the cheese. While this invention produces a good pasta filata-type cheese, it cannot be used to make other cheese, such as Cheddar cheese, and more importantly, the step of separating the whey proteins and casein and denaturing the whey proteins involves additional costs and work. Other than the cumbersome process disclosed in U.S. Pat. No. 4,919,943, there appears to be no process for making a natural cheese with acceptable melt properties and incorporating high levels of whey proteins. As discussed above, UF cheese has been mixed with natural cheese to make processed cheese that has acceptable melt characteristics. However, processed cheese, which has a higher sodium content than natural cheese due the addition of emulsifying agents, is not as desirable as natural cheese, containing no emulsifying agents, for many customers and applications. Also, as disclosed in U.S. Pat. No. 4,885,183, some processed cheeses made with UF cheese have reduced melt characteristics if the whey proteins cross-link during processing.

Thus, the prior attempts have been unsuccessful in devising an efficient, economical process that can produce natural cheese having acceptable melt characteristics incorporating high levels of whey proteins (at a ratio of at least 1:16 whey proteins to casein) There is, therefore, an unsatisfied, long-felt need for such product and for a process and system for making such a product.

SUMMARY OF THE INVENTION

Cheeses have been invented that include high levels of whey proteins and still have acceptable melt characteristics. Economical processes for making such cheese have also been invented In a first aspect, the invention is a cheese composition, preferably free of emulsifying agents, and comprising undenatured whey proteins and casein and having a whey proteins to casein weight ratio of at least 1:16, a Schreiber melt test value of at least 1.75 and a Mettler melt temperature of less than 200° F.

In a second aspect, the invention is a cheese composition containing a blend of one or more conventional cheeses and one or more cheeses containing whey proteins and casein at a weight ratio of at least 1:8 whey proteins to casein, the composition comprising whey proteins and casein at a weight ratio of at least 1:16 whey proteins to casein, the composition preferably being free of emulsifying agents, and having a Schreiber melt test value of at least 1.75 and a Mettler melt temperature of less than 200° F.

In a third aspect, the invention is a an American-type cheese containing casein and at least one-sixteenth as much whey proteins, by weight, as the casein, the cheese preferably being free of emulsifying agents, and having a Schreiber melt test value of at least 1.75 and a Mettler melt temperature of less than 200° F.

In a fourth aspect, the invention is a cheese containing undenatured whey proteins and casein and having a whey proteins to casein weight ratio of at least 1:16 and a microstructure with a substantially continuous protein phase.

In a fifth aspect, the invention is a process for converting a cheese with poor melt characteristics to a cheese with good melt characteristics comprising the steps of 1) providing a cheese comprising whey proteins and casein at a ratio of at least 1:16 whey proteins to casein, 2) heating the cheese to a temperature of above 125° F., 3) mixing the cheeses preferably in the absence of emulsifying agents, until a homogeneous cheese mass is obtained and 4) cooling the heated, mixed cheese.

In a sixth aspect, the invention is a process for making a cheese with a higher level of whey proteins than in conventional cheese and having good melt properties comprising the steps of 1) providing one or more first cheeses containing a weight ratio of less than 1:40 whey proteins to casein and one or more second cheeses containing whey proteins and casein at a weight ratio of at least 1:16 whey proteins to casein, 2) mixing the first and second cheeses, preferably in the absence of emulsifying agents, while heating the mixture and 3) cooling the mixture to form the cheese; the ratio of first and second cheeses, the shear conditions during mixing, the temperature of heating and the rate of cooling of the mixture being sufficient to produce a cheese with a Schreiber melt test value of at least 1.75 and a Mettler melt temperature of less than 200° F.

In a seventh aspect, the invention is a process for producing a cheese with a higher level of whey proteins than conventional cheese and having good melt properties comprising the steps of providing a cheese with a ratio of whey proteins to casein of at least 1:16, the cheese having a discrete protein microstructure, and modifying the microstructure of the cheese proteins such that the proteins form a continuous phase structure, the resulting cheese having a Schreiber melt test value of at least 1.75 and a Mettler melt temperature of less than 200° F.

The cheese of the present invention can be made from UF cheeses, and yet has the melt properties of conventional cheese The processes of the present invention thus provide an efficient, economical way of producing cheese containing high levels of whey proteins, but which still has acceptable melt properties.

BRIEF DESCRIPTION OF THE DRAWINGS

FIG. I is a photomicrograph showing the protein microstructure of a conventional Cheddar cheese.

DETAILED DESCRIPTION OF THE DRAWINGS AND PREFERRED EMBODIMENTS OF THE INVENTION

Definitions

Figure 1:

"Conventional cheese" as used herein means a cheese made by the traditional method of coagulating milk, cutting the coagulated milk to form discrete curds, stirring and heating the curd, draining off the whey, and collecting or pressing the curd. Cow's milk contains whey proteins and casein at a weight ratio of about 1:4 whey proteins to casein. The conventional process for making natural cheese recovers the casein from the milk. Whey proteins dissolved in the whey are mostly discharged during the whey drainage step. The whey proteins to casein ratio is between about 1:150 and about 1:40 for conventional cheese. For example, Cheddar cheese contains about 0.3% whey proteins. The whey proteins to casein ratio is about 1:100 in typical Cheddar cheese, the most common conventional cheese.

"American-type cheeses" as used herein means the group of conventional cheeses including Cheddar, washed curd, Colby, stirred curd cheese and Monterey Jack. All must contain at least 50 percent fat in dry matter (FDM). Modifications in the process for making Cheddar led to the development of the other three varieties. Washed curd cheese is prepared as Cheddar through the milling stage, when the curd is covered with cold water for 5 to 30 minutes. Washing increases moisture to a maximum of 42 percent. Stirred curd cheese has practically the same composition as Cheddar but has a more open texture and shorter (less elastic) body. It is manufactured as Cheddar except that agitation of cooked curd particles is used to promote whey drainage, and the Cheddaring and milling steps are eliminated. Colby cheese and Monterey Jack cheese are manufactured the same way as stirred curd except that water is added to wash and cool the curd when most of the whey has been drained away, thus increasing the moisture content to a maximum of 40 percent for Colby cheese and 44 percent for Monterey Jack cheese.

"Pasta filata-type cheese" as used herein means a type of cheese having a plastic, pliable, homogeneous, stringy structure. The pasta filata cheeses are traditionally made by producing curds and whey, draining the whey and immersing the curd in hot water or hot whey and working, stretching, and molding the curd while it is in a plastic condition. The principal varieties of pasta filata cheeses are: Cociocavallo, Provolone, Provolette, Pizza cheese, Mozzarella, Provole, Scamorze, and Provatura. The most well-known example of pasta filata-type cheese is Mozzarella. In the U.S., the Standards of Identity of the Code of Federal Regulations subdivides Mozzarella cheeses into: "Mozzarella", "Low Moisture Mozzarella," "Part Skim Mozzarella", and "Low Moisture Part Skim Mozzarella." As defined by Food and Drug Administration (FDA) regulations, Mozzarella has a moisture content of more than 52 but not more than 60 weight percent and fat in dry matter (FDM) of not less than 45 percent by weight. The Low Moisture Mozzarella has a moisture content of more than 45 but not more than 52 weight percent and FDM of not less than 45 weight percent. The Part Skim Mozzarella contains more than 52 but not more than 60 percent of moisture by weight and has FDM of less than 45 but not less than 30 percent. The Low Moisture Part Skim Mozzarella contains more than 45 but not more than 52 percent of moisture by weight and has FDM of less than 45 but not less than 30 percent.

"Processed cheese" as used herein generally refers to a class of cheese products that are produced by comminuting, mixing and heating natural cheese into a homogeneous, plastic mass, with emulsifying agents and optional ingredients, depending on the class of processed cheese produced. The comminuted cheese is blended and sent to cookers or the like which commonly heat the mass to a temperature of 165°–185° F. During cooking, fat is stabilized with the protein and water by the emulsifying agents, which are typically citrate or phosphate salts, usually at a level of about 30%. The salts cause the protein to become more soluble. Under these circumstances a stable emulsion of protein, fat and water occurs to provide a smooth, homogeneous mass. The hot mass is packaged directly, or formed into slices and packaged There are four main classes of processed cheese: pasteurized process cheese, pasteurized process cheese food, pasteurized process cheese spread and pasteurized process cheese product. All four classes of processed cheese are made with emulsifying agents In the U.S., Standards of Identity apply to pasteurized process cheese and are established by the FDA. By those standards, whey solids, including whey proteins, may not be added to the pasteurized process cheese.

"Emulsifying agents" as used herein means emulsifying agents used in the making of processed cheese. These include one or any mixture of two or more of the following inorganic salts: monosodium phosphate, disodium phosphate, dipotassium phosphate, trisodium phosphate, sodium metaphosphate, sodium acid pyrophosphate, tetrasodium pyrophosphate, sodium aluminum phosphate, sodium citrate, potassium citrate, calcium citrate, sodium tartrate, and sodium potassium tartrate. In processed cheese, these emulsifying agents act as calcium sequestering (or chelating) agents.

"Natural cheese" as used herein means a cheese that does not contain emulsifying agents. Conventional cheeses (containing very small amounts of whey proteins) and cheeses made using a UF process (containing high levels of whey proteins) are the usual varieties of natural cheeses. The present invention involves a natural cheese with high levels of whey proteins and good melt characteristics.

The present invention and the benefits thereof are most easily understood when described in terms of several standards for evaluating the melt properties of cheese

TEST PROCEDURES
Schreiber Melt Test

The L. D. Schreiber melt test is a well known and accepted standardized test for determining the melt properties of cheese. The test uses a kitchen oven and a standardized piece of cheese, and measures the size of the cheese piece after it is melted. The instructions for the procedure, as used in the following tests, are as follows:

1 Preheat oven to 450° F. (232.2° C.).

2. Slice cheese 3/16 thick (5 mm). If cheese is already sliced, use 2-3 slices to get closest to the 3/16 thickness.

3. Cut a circle out of the cheese slice using a copper sampler with a diameter of 39.5 mm.

4. Center the cheese circle in a thin wall 15×100 mm Petri dish, cover and place on the center rack of the oven. Do this quickly so the oven temperature does not drop below 400° F. (204.4° C.)

5. Bake for 5 minutes and remove. Up to 4 dishes may be done at the same time.

6. Once cooled, the melt is measured on the score sheet.

The score sheet comprises a series of concentric circles with increasing diameters. The first circle has a diameter of 40.0 mm. Each succeeding circle is 6.5 mm larger is diameter. The melted cheese receives a score of 1 if it fills the first circle, a score of 2 if it fills the second circle, etc. As used herein, the scores include a "+" (or "−") indicating that the cheese was slightly larger (or smaller) than the indicated score ring. A cheese with an acceptable Schreiber melt test will score 3 or above.

Because the cheese does not always flow in a symmetric manner when melting, and thus crosses over a score ring only in certain areas, a melt value was calculated for many of the Schreiber melt test scores reported below.

The term "melt value" as used herein is defined as the ratio of the area of the melted cheese to the area of the original unmelted cheese using the Schreiber melt test procedure. Thus, a melt value of 1.0 means the cheese did not increase in surface area during the melt test, whereas a melt value of 2.0 indicates that a doubling of area occurs during the Schreiber melt test. In general, a cheese with acceptable melt characteristics should have a melt value of greater than 1.75, which, if the sample melts in a uniform, round shape, is equivalent to a melt test score of 3 or greater.

Increases in surface area can be determined in a number of ways, such as cutting out a piece of paper the size of the original cheese and another the shape of the melted cheese and weighing the two pieces of paper. For the test results reported below, a photostatic copy of the melted cheese was made and the image on the photocopy was analyzed using a computer imaging system. Specifically, the photocopies were placed on a copy stand and digitized into a 33 MHz 486 IBM-AT compatible computer using an Imaging Technology Incorporated CFG frame grabber and a JAVELIN 7442 CCD video camera. OPTIMAS image analysis software was used for all aspects of the operation, including acquisition and measurement. A FOSTEC fiber optic ring light was used for illumination. The system was calibrated for aspect ratio to compensate for distortion caused by pixel height and width in the camera and frame grabber by using the procedure available in OPTIMAS. Distance was then calibrated from the known size of the Petri dish also visible in the photocopy by placing a scale in the field of view, digitizing the image and again using the calibration procedures available in OPTIMAS. Measurements were taken by drawing the outer edge of the melted cheese, avoiding what was considered to be condensation. The drawing was done by tracing the edge with a cursor that was positioned by moving the computer mouse. Data was then sent to Microsoft Excel 4.0 by OPTIMAS using Dynamic Data Exchange.

METTLER MELT TEST

The meltabilities of cheeses can also be compared using an apparatus for determination of dropping point or softening point, such as the Mettler FP 800 thermosystem. In such an apparatus, the temperature at which a plug of cheese falls through an orifice is measured. In general, cheeses with acceptable melt characteristics have a Mettler melt temperature below 200° F. Cheeses exhibiting non-melt characteristics will not melt at 230° F., which is the shut-off temperature of the Mettler FP 800 instrument as set up for this test, which prevented the temperature from rising too high and burning non-melting samples inside the instrument. The Mettler FP 800 instrument was set up with the start temperature at 130.0° F. and the heating temperature rate at 5.0° F./minute.

The instructions for sample preparation are as follows:

1. The sample cup (middle piece) is pushed through the cheese sample until the sample extruded from the small top hole of the cup.

2. A knife is used to carefully trim around the cup and square off cheese at the top and bottom (For Mozzarella, the sample may not completely be touching the sides of the cup).

3. Samples of cheese to be prepared are kept in air tight bags to prevent drying out. Samples of cheese that are prepared for analysis in their cups are kept in a Petri dish to prevent drying out if they are not to be analyzed immediately.

4. The bottom holder and top holder of the sample cup are assembled with the center section.
5. The entire assembly, using the top holder stem, is placed in the oven and gently turned until it is seated on the bottom of the oven.
6. After the sample is placed in the instrument, the RUN/STOP button is pushed At this point there is a 30 second count-down while the oven temperature equilibrates at 130° F. The oven temperature will begin to rise and will shut off at the softening point of the cheese or at 230° F., in case the cheese does not soften and flow. The softening point reading will be printed on paper, or the end temperature (230° F.) will be printed if the cheese does not soften.
7. A fan inside the oven will turn on to bring the temperature back to 130° F. or below When the fan has turned off, the entire assembly is removed from the oven and disassembled. The sections are cleaned using the scraper provided for the cup and tweezers to remove cheese from the bottom holder.

FNS MELT TEST

The FNS (Food and Nutrition Service, USDA) melt test of cheese is patterned after the meltability requirement for cheeses acceptable for FNS. That requirement, as set forth in 7 CFR Chapter II, Part 210, Appendix A (1-1-89 edition), states, "Fifteen grams of product in shredded form on a slice of bread must melt to a smooth consistency and lose shred identity in a maximum of 3 minutes when placed in a conventional oven preheated and set at 500 degrees Fahrenheit."

For the tests and examples below, 4×6 inch pizza crusts were used instead of bread. The cheese was shredded with a hand shredder and 15 g was placed inside of a 3½ inch ring on the crust. The rings were removed and the crusts were placed in a 500° F. oven for 3 minutes. They were cooled for approximately 1-2 minutes and then scored as follows:

| Score | Comments |
|---|---|
| Excellent | Total loss of shred identity, cheese melts, and flows. |
| Good | Cheese is mostly melted and fluid, shreds melt and lose shape, 75% of shred identity is lost. |
| Fair | Some melting evident, shred identity evident over 50% of area. |
| Poor | No melt, shreds evident. |

In general, cheeses with acceptable melt characteristics have a FNS melt score of at least "good".

The above test procedures were applied to a variety of conventional and UF cheese samples. Those samples were also used in the examples of the invention below. A description of each of the samples follows. The approximate composition and melt characteristics of the samples are listed in Table 1.

CHEESE SAMPLE IDENTIFICATION

Samples 1, 2 and 3

Two samples (Samples 1 and 2) of conventional 40 pound block Cheddar cheese were obtained from Mullins Cheese Inc., Mosenee, Wis. and one sample (Sample 3) of conventional stirred curd cheese packed in a 500 pound barrel was obtained from Chaseburg Co-op Creamery, Chaseburg, Wis. It is believed that the samples were made by treating milk with lactic acid producing bacteria to a suitable acidity, coagulating the milk with a rennet, cooking the resulting curd and whey, and draining the whey from the curd. The curd was Cheddared or stirred while additional acid was produced by fermentation of lactose to lactic acid in the curd. The curd was then milled, salted and pressed into rectangular blocks or packed into barrels for maturing. This conventional process for making natural cheese recovered only the casein. Whey proteins dissolved in the whey were mostly discharged during the whey drainage step.

Sample 4

A conventional low fat Cheddar cheese was obtained from the Land O'Lakes, Inc., Denmark, Wisconsin. It is believed that the sample was made by the conventional process, as described above, except that partially skimmed milk was used Sample 5

A conventional Low Moisture Part Skim Mozzarella cheese was obtained from the Mid-America Dairymen Inc., Bloomer, Wis. This pasta filatatype cheese had a plastic, pliable, homogeneous, stringy structure. It is believed that the sample was made by producing curds and whey from the partially skim milk, draining the whey, immersing the curd in hot water or hot whey, and working, stretching, and molding the curd while it was in a plastic condition.

Sample 6

A UF cheese made by Schreiber Foods, Inc. using the Yee et al. process disclosed in U.S. Pat. No. 5,165,945 was obtained The cheese was made by ultrafiltering and diafiltering milk to produce a retentate, renneting the retentate, heating the renneted retentate (the renneted retentate formed a coagulum during the heating), then adding lactic culture to the renneted and heat-treated retentate, evaporating the excess water from the coagulated retentate to produce unfermented cheese, and allowing fermentation to produce fermented high solids cheese. The resulting cheese contained casein and substantially all the whey proteins of the original milk.

Samples 7 and 8

Two UF cheeses made by Schreiber Foods, Inc. using the Jameson et. al. process disclosed in European Patent Publication No. 0 065 981 were obtained Both UF cheeses were prepared by ultrafiltering and diafiltering milk to produce a retentate, adding salt to increase the ionic strength of the retentate, fermenting the retentate and removing water from the fermented retentate by evaporation to produce cheese containing all the casein and whey proteins of the original milk. For Sample 7, the fermented retentate was treated with rennet in an amount sufficient t-o coagulate the retentate prior to evaporation. Sample 8 was prepared without a rennet treatment step.

Sample 9

A UF cheese was made by the process described in Rubin et. al. U.S. Pat. No. 4,401,679. The cheese was made by ultrafiltering and diafiltering milk to produce retentate, inoculating the retentate by the addition of an acid culture, evaporating the inoculated retentate to remove water, and packing the product and acidifying the packed and prepared product to produce UF cheese containing all the casein and whey proteins originally present in the milk.

Sample 10

A UF low fat cheese made by Schreiber Foods, Inc. using the Yee et. al. process disclosed in U.S. Pat. No. 5,165,945 was obtained. The product was prepared the same way as Sample 6 except that the milk used was partially skimmed before the ultrafiltering and diafiltering step.

As clearly shown in Table 1, the conventional cheese samples all had Schreiber melt scores of 3 or better, melt values above 1.75, Mettler melt temperatures of less than 200° F. and "excellent" FNS melt scores. On the other hand, the UF cheese samples all had Schreiber melt scores below 3, melt values below 1.75, Mettler melt temperatures greater than 200° F. and FNS melt test scores of "fair" or "poor".

and low shear agitation, natural cheese can be heated and blended without emulsifying agents.

TABLE 1

PROPERTIES OF CHEESE SAMPLES

| CHEESE SAMPLE I.D. # | CHEESE TYPE | COMPOSITION | | | | MELT CHARACTERISTICS | | | |
|---|---|---|---|---|---|---|---|---|---|
| | | | | | | SCHREIBER | METTLER | | |
| | | % MOISTURE | % FAT | % SALT | pH | MELT SCORE | MELT VALUE | MELT TEMP. | FNS MELT SCORE |
| 1 | Conventional Block Cheddar | 37.23 | 32.5 | 1.80 | 5.15 | 4+ | — | 151° F. | Excellent |
| 2 | Conventional Block Cheddar | 36.63 | 32.5 | 1.72 | 5.22 | 4 | 2.32 | 149° F. | Excellent |
| 3 | Conventional Barrel Cheese | 31.51 | 38.5 | 1.48 | 5.02 | 4− | 2.13 | 168° F. | Excellent |
| 4 | Conventional Low Fat Cheddar | 43.85 | 21.0 | 0.88 | 5.36 | 3+ | 2.05 | 154° F. | Excellent |
| 5 | Conventional Low Moisture, Part Skim Mozzarella | 46.92 | 21.0 | 0.58 | 5.49 | 3+ | 1.97 | 154° F. | Excellent |
| 6 | UF Cheese (Yee et al.) | 27.32 | 42.0 | 0.10 | 5.24 | 1+ | 1.19 | Not Melted at 230° F. | Poor |
| 7 | UF Cheese with Rennet (Jameson et al.) | 33.23 | 37.0 | 1.42 | 5.42 | 2+ | 1.55 | Not Melted at 230° F. | Fair |
| 8 | UF Cheese w/o Rennet (Jameson et al.) | 33.98 | 38.0 | 1.62 | 5.10 | 2 | 1.45 | Not Melted at 230° F. | Fair |
| 9 | UF Cheese (Rubin et al.) | 44.93 | 30.5 | 1.26 | 5.03 | 1 | 1.00 | Not Melted at 230° F. | Poor |
| 10 | UF Low Fat Cheese (Yee et al.) | 41.08 | 25.0 | 1.12 | 5.68 | 2− | 1.26 | 206° F. | Fair |

Other UF cheese samples with variety of moisture contents were tested to determine their melt properties. The cheese samples were similar to Sample 6. Their moisture contents and melt properties are shown in Table 2 below.

TABLE 2

| UF CHEESE SIMILAR TO SAMPLE 6 | % H₂O | MELT CHARACTERISTICS | | |
|---|---|---|---|---|
| | | SCHREIBER MELT SCORE | METTLER MELT TEMPERATURE | FNS MELT SCORE |
| A | 26.61 | 1 | Not melted at 230° F. | Poor |
| B | 31.25 | 1+ | Not melted at 230° F. | Poor |
| C | 33.49 | 2− | Not melted at 230° F. | Poor |
| D | 34.42 | 2 | Not melted at 230° F. | Fair |
| E | 37.12 | 2 | Not melted at 230° F. | Fair |
| F | 38.49 | 2 | Not melted at 230° F. | Fair |

From the results of these tests it was learned that the poor melt performance of UF cheeses could not be significantly improved by increasing their moisture level.

EXPERIMENTS AND EXAMPLES

The present invention was discovered and developed during the performance of many experiments, some of which are also examples of the invention.

It is generally thought that if natural cheese is heated, the fat will melt and "oil-off" and the natural emulsion in cheese will break. For this reason, process cheese was developed to allow heating and pasteurization of natural cheese, but always included emulsifying agents so that the fat was stably incorporated back into the process cheese. The present applicants have surprisingly found that by gradual heating Several standardized pieces of equipment and containers were used in the experiments and examples. Two sizes of Rietz cookers were used, both from Custom Stainless Equipment Company, Inc., Santa Rosa, Calif. A 45 pound cooker used was a Model No. CDB-0718-FDV. A 10 pound cooker used was a Model No. CDB-0412-FJD. A cheese grinder used was a conventional 40 pound cheese block grinder Model #7500 from Koss Industry, DePere, Wis.

Cooling of the cheese took place in a 40° F. walk-in cooler. The samples were placed in three standard sized containers: 20 pound; 64 ounce and 8 ounce. The 20 pound container was a corrugated box with inside dimensions of 10¾"×7"×7" made of 200 pound Mullen test material and including a 1.7 mil linear low density polyethylene bottom seal bag liner. The 64 and 8 ounce containers were tubs made of Amoco No. 7234 polypropylene. The 64 ounce tub had a top diameter of 6.7 inches, a middle diameter of 6.3 inches and bottom diameter of 5.1 inches, and a depth of 4.4 inches. The 8 ounce tub had a top diameter of 4.6 inches, a middle diameter of 4.1 inches, and a bottom diameter of 2.1 inches, and a depth of 1.6 inches. Both tubs had a wall thickness of approximately 0.039 inches.

Exact cooling times were not recorded for the individual experiments However, for the 20 pound box, with the cheese starting at 145° F., it generally took two to three hours for the core temperature of the cheese to fall to 120° F., about five to six hours to fall to 100° F. and about 25 hours to fall to 45° F. For the 64 ounce tubs, again starting at 145° F., the core temperature of the cheese generally took in the range of about one hour to fall to 120° F., about two hours to fall to 100° F. and about six hours to fall to 45° F. For the 8 ounce tubs, the respect times were generally in the range of 20 minutes and 3 hours.

EXPERIMENT 1

Sample 1 conventional Cheddar cheese in 40 pound block form was used. The block Cheddar cheese was ground using the conventional cheese grinder. Forty pounds of the ground cheese was gradually heated and mechanically worked inside a 45 pound Rietz cooker with steam jacket heating and the Rietz auger speed set at 50 rpm, resulting in an auger tip velocity of 98 ft./min. The cheese was gradually heated up to 141° F., continuously applying the mechanical manipulation through auger shear. Some texture appearance changes during the heating and mechanical manipulation were observed and recorded in Table 3.

TABLE 3

| TIME (MINUTE) | TEMPERATURE (°F.) | COMMENTS |
| --- | --- | --- |
| 0 | 67 | Crumbly, rough. |
| 2 | 83 | Crumbly, rough. |
| 3 | 101 | Doughy texture, started oiling off. |
| 5 | 127 | Lots of oiling off. |
| 6 | 137 | Oil started incorporating. |
| 7 | 140 | More oil incorporated back into cheese mass. |
| 8 | 141 | Shiny, smooth, homogeneous mass with slightly stringy characteristics. |

As all the released oil was incorporated back into the cheese mass and a shiny, smooth, homogeneous cheese mass formed; the heated cheese was discharged and packed in 8 ounce plastic containers for cooling in a 40° F. cooler. The melt properties of the resulting treated cheese, as compared to the untreated block Cheddar, are listed in Table 4.

TABLE 4

| CONVENTIONAL | MELT CHARACTERISTICS | | |
| --- | --- | --- | --- |
| BLOCK CHEDDAR CHEESE SAMPLE 1 | SCHREIBER MELT SCORE | METTLER MELT TEMP. | FNS MELT SCORE |
| Untreated | 4+ | 151° F. | Exc. |
| Treated | 5 | 153° F. | Exc. |

The heat process treatment as described in Example 1 slightly improved the melt properties of the conventional block Cheddar cheese. Both treated and untreated cheese samples possessed acceptable melt performance.

EXPERIMENT 2

This experiment further demonstrates the effect of shear and cooling on the melt properties of the heat-processed conventional Cheddar cheese.

Three batches of 40 pound ground Sample 1 conventional block Cheddar cheese were subjected to gradual heating up to 140° F. inside a 45 pound Rietz cooker with steam jacket heating and continuous auger mixing at three different speeds (i.e. 50, 70, and 160 rpm, or 98, 137 and 314 ft./min auger tip speed, respectively). As soon as the oil was incorporated back into the cheese mass and a shiny, smooth and homogeneous cheese mass was obtained for each batch, as described in Example 1, the cheese mass from each batch was discharged into three different sized packages for further cooling inside a 40° F. cooler. Cheese was packaged in 8 ounce plastic tubs for fast cooling, 64 ounce plastic tubs for medium cooling, and 20 pound corrugated boxes with liners for slow cooling.

The melt properties of the resulting treated cheeses were measured and are listed in Table 5.

TABLE 5

| | FAST COOLING | | | MEDIUM COOLING | | | SLOW COOLING | | |
| --- | --- | --- | --- | --- | --- | --- | --- | --- | --- |
| SHEAR (RPM) | SCHREIBER MELT SCORE | METTLER MELT TEMP. | FNS MELT SCORE | SCHREIBER MELT SCORE | METTLER MELT TEMP. | FNS MELT SCORE | SCHREIBER MELT SCORE | METTLER MELT TEMP. | FNS MELT SCORE |
| 50 | 5+ | 153° F. | Exc. | 4+ | 160° F. | Exc. | 3+ | Not melted at 230° F. | Exc. |
| 70 | 4+ | 156° F. | Exc. | 3+ | 160° F. | Exc. | 3+ | Not melted at 230° F. | Good |
| 160 | 4 | 176° F. | Exc. | 3+ | 171° F. | Good | 2 | Not melted at 230° F. | Fair |

While the results from Experiment 1 show that a heat treated conventional cheese can retain good melt properties, these results clearly demonstrate the detrimental impact of the high shear, along with the slow cooling, on melt performance of the 140° F. heat-processed Cheddar cheese.

EXPERIMENT/EXAMPLE 3

Sample 6 high solids UF cheese, prepared according to the Yee et al. process, was ground with the conventional grinder. Ten pounds of the ground UF cheese (27.4% moisture and 0.1% salt) was mixed with 804 grams of water and 82 grams of salt to target a finished product with a composition comparable to conventional Cheddar cheese The UF cheese blend mixture was then heated gradually to 145° F. inside a 10 pound size Rietz cooker with steam jacket heating and continuous auger mixing at a speed of 90 rpm. This auger speed provided a auger screw tip velocity of 94 ft./min., comparable to the 50 rpm (98 ft./min. tip velocity) operation of the 45 pound Reitz cooker of Example 1. Similar texture appearance changes from a crumbly, rough and mealy blend texture at 70° F. to a shiny, smooth, homogeneous cheese mass at 145° F. was also observed during the heating and working of the UF cheese. The homogeneous cheese mass with some stringy characteristics was discharged at 145° F. and packed in 8 ounce plastic tub containers for further cooling in a 40° F. cooler. The melt properties, as compared to the untreated UF cheese, are shown in Table 6.

Figure 4:
FIG. 4 is a photomicrograph showing the protein microstructure of the UF cheese of FIG. 3 after it had been subjected to a low shear, low temperature mixing process followed by fast cooling.

FIG. 4) indicate that a microstructure transformation had occurred due to the treatment. The process transformed a UF

TABLE 6

| UF CHEESE | COMPOSITION | | | MELT CHARACTERISTICS | | | |
|---|---|---|---|---|---|---|---|
| | | | | SCHREIBER | METTLER | | FNS |
| (YEE et al.) SAMPLE 6 | % MOISTURE | % FAT | % SALT | MELT SCORE | MELT VALUE | MELT TEMP. | MELT SCORE |
| Untreated | 27.32 | 42.0 | .10 | 1+ | 1.19 | Not melted at 230° F. | Poor |
| Treated | 37.42 | 37.0 | 1.80 | 3+ | 1.86 | 170° F. | Exc. |

Unexpectedly, the low shear heating and mixing treatment, followed by fast cooling, transformed the Sample 6 UF cheese to a product with excellent melt properties.

Experiment 1 was repeated using Sample 2 cheese. Both untreated and treated cheese samples (Sample 2, conventional block Cheddar cheese) and Example 3, Sample 6 UF cheese were subjected to Transmission Electron Microscopic (TEM) analysis The samples were cut into small pieces and covered with glutaraldehyde overnight. The samples were washed with sodium cacodylate buffer, stained with osmium tetroxide, washed again, stained with uranyl acetate, washed, and dried with a series of ethanol solutions. After propylene oxide treatment, the samples were embedded with Embed 812 (Electron Microscopy Sciences, Ft. Washington, Pa.) and vacuum treated to remove excess propylene oxide. Following embedding and polymerization, the sample block was sectioned to 90–150 nm (gold color). Ribbons of the sections were picked up on grids from the trough and allowed to air dry. Sections on the grids were post stained using uranyl acetate followed by lead citrate. The grids were inserted into a Hitachi 600 transmission electron microscope set at 75 KV. The magnification calibration was performed by recording the image of a carbon replica of a grating. Pictures of random fields were taken and micrographs were printed at 1530× magnification.

Figure 2:
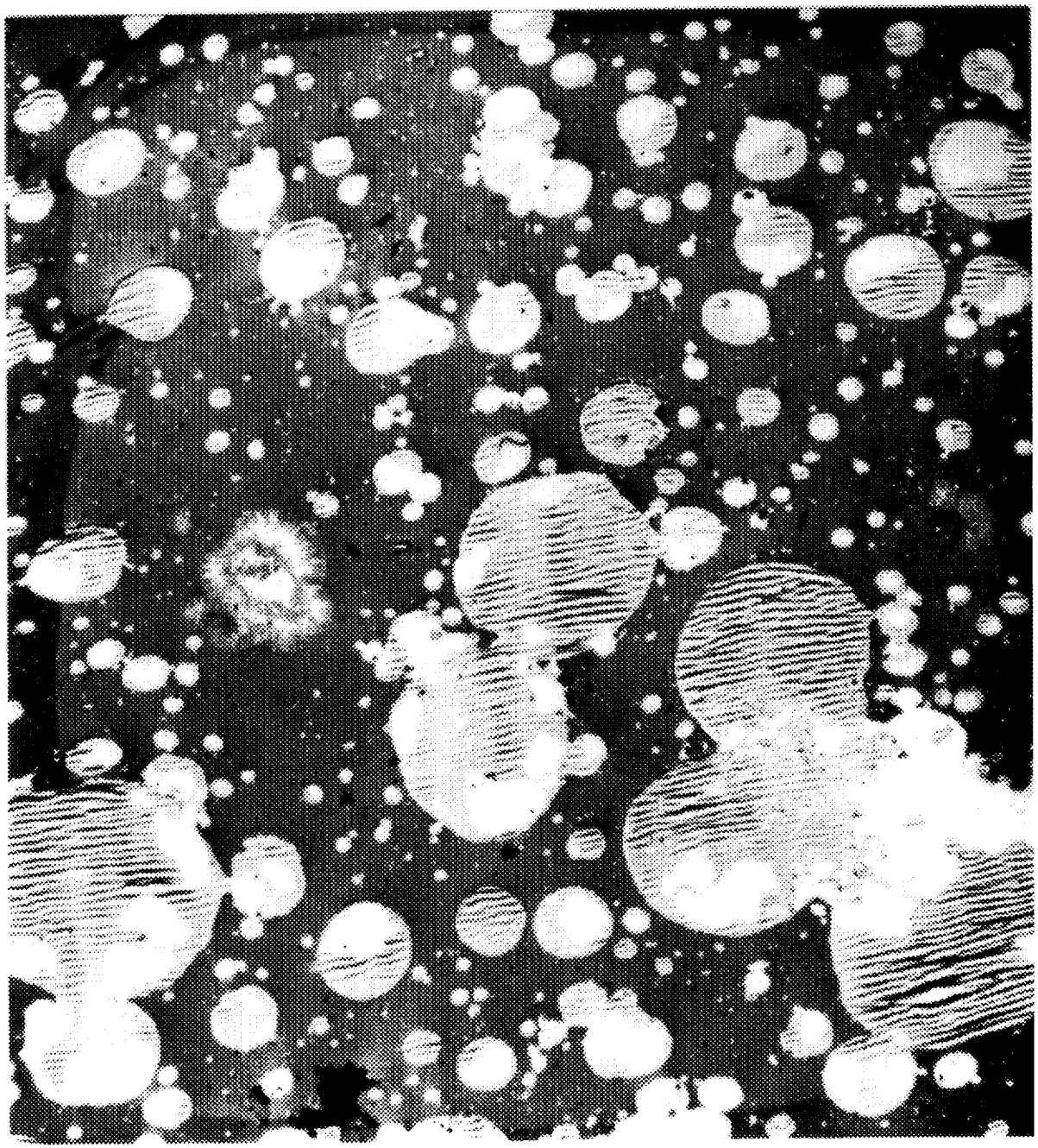
FIG. 2 is a photomicrograph showing the protein microstructure of the Cheddar cheese of FIG. 1 after it had been subjected to a low shear, low temperature mixing process followed by fast cooling.

The protein matrix shows up as a dark area on the micrographs, whereas the fat globules show up as mostly white empty holes. The TEM picture of the untreated conventional block Cheddar cheese at 1530× magnification (FIG. 1) indicated that fat globules were trapped in the continuous protein matrix. The TEM picture of the heated/worked Cheddar sample at 1530× magnification (FIG. 2) also showed more rounded fat globules embedded in the protein matrix, similar to the untreated Cheddar sample (FIG. 1).

Figure 3:
FIG. 3 is a photomicrograph showing the protein microstructure of a UF cheese with high levels of whey proteins made by an ultrafiltration process.

FIG. 3 shows the TEM micrograph of untreated Sample 6 UF cheese at 1530×magnification. FIG. 4 shows the TEM micrograph of Sample 6 treated UF cheese at 1530× magnification. Comparison of the two micrographs (FIG. 3 vs.

cheese with a discrete protein matrix (FIG. 3) to a UF cheese with a more continuous protein matrix (FIG. 4). More significantly, the treated UF cheese had the protein matrix microstructurally much more closely resembled the smooth and continuous protein matrix of the conventional Cheddar cheese (FIG. 1).

The microstructure transformation to the continuous protein matrix which more closely resembles the conventional Cheddar cheese provides one possible explanation of the surprising melt improvement in the treated UF cheese.

EXPERIMENT/EXAMPLE 4

Ten pounds of Sample 7 cheese, a high solids UF cheese as prepared according to the Jameson, et al. process with rennet treatment of the fermented retentate, was mixed with 245 grams of water inside the 10 pound size Rietz cooker to target a finished product having a moisture content comparable to conventional Cheddar cheese. The process treatment of low temperature heating (145° F.), low shear mixing (90 rpm auger speed) and fast cooling of the discharged homogeneous cheese mass were the same as that described in Example 3. The melting properties of the treated UF cheese, as compared to the untreated UF cheese, are shown in Table 7.

TABLE 7

| UF CHEESE (Jameson et al.) | | | | MELT CHARACTERISTICS | | | |
|---|---|---|---|---|---|---|---|
| WITH RENNET | COMPOSITION | | | SCHREIBER | METTLER | | FNS |
| TREATMENT SAMPLE 7 | % MOISTURE | % FAT | % SALT | MELT SCORE | MELT VALUE | MELT TEMP. | MELT SCORE |
| Untreated | 33.23 | 42.0 | 1.42 | 2+ | 1.55 | Not melted at 230° F. | Fair |
| Treated | 37.40 | 35.0 | 1.36 | 3+ | 1.81 | 167° F. | Exc. |

Again, the above process treatment transformed the Sample 7 Jameson et al. process UF cheese with unacceptable melt performance to a cheese with an acceptable melt performance.

EXPERIMENT/EXAMPLE 5

Ten pounds of Sample 10 cheese, a UF low fat cheese made according to the Yee et al. process, was heated and worked inside a 10 pound size Rietz cooker with 429 grams of water and 22.7 grams of salt to target a finished cheese having a composition comparable to a conventional low fat Cheddar cheese. The process treatment of low temperature heating (to 145° F.); low shear mixing (90 rpm auger speed) and fast cooling of the discharged homogeneous cheese mass in 8 ounce plastic containers was the same as that described in Example 3. The melt properties of the resulting treated UF low fat cheese, as compared to the untreated UF low fat cheese, are shown in Table 8.

TABLE 8

| UF CHEESE | COMPOSITION | | | MELT CHARACTERISTICS | | | |
|---|---|---|---|---|---|---|---|
| | | | | SCHREIBER | | METTLER | FNS |
| (YEE et al.) SAMPLE 10 | % MOISTURE | % FAT | % SALT | MELT SCORE | MELT VALUE | MELT TEMP. | MELT SCORE |
| Untreated | 41.08 | 25.0 | 1.12 | 2– | 1.26 | 206° F. | Fair |
| Treated | 44.52 | 23.5 | 1.52 | 3– | 1.74 | 186° F. | Good |

Again, the above process treatment significantly improved the melt performance of the Sample 10 UF low fat cheese made according to the Yee et al. process

EXPERIMENT 6

Ten pounds of Sample 8 cheese, a high solids UF cheese as prepared according to the Jameson et al. process without rennet treatment, was mixed with 245 grams of water in a 10 pound size Rietz cooker. The same process treatment was applied as described in Example 3; namely with the gradual heating up to 145° F. with continuous low shear at 90 rpm of auger speed, and fast cooling of the discharged homogeneous cheese mass packed in 8 ounce plastic tubs for further cooling in a 40° F. cooler. The melt properties of the treated and untreated UF cheese were measured and reported in Table 9.

TABLE 9

| UF CHEESE (Jameson et al.) | | | | MELT CHARACTERISTICS | | | |
|---|---|---|---|---|---|---|---|
| W/O RENNET | COMPOSITION | | | SCHREIBER | | METTLER | FNS |
| TREATMENT SAMPLE 8 | % MOISTURE | % FAT | % SALT | MELT SCORE | MELT VALUE | MELT TEMP. | MELT SCORE |
| Untreated | 33.98 | 38.0 | 1.62 | 2 | 1.45 | Not melted at 230° F. | Fair |
| Treated | 37.08 | 36.0 | 1.52 | 2 | 1.37 | Not melted at 230° F. | Fair |

Interestingly, the above process treatment did not improve the melt performance of the Sample 8 UF cheese made according to the Jameson et al. process without rennet treatment.

EXPERIMENT 7

Ten pounds of Sample 9, a UF cheese prepared according to the Rubin et al. U.S. Pat. No. 4,401,679 was ground, heated and worked in a 10 pound size Rietz cooker. The same process treatment as described in Example 3 was applied to the cheese, namely gradual heating up to 145° F., continued auger shear set at 90 rpm, and fast cooling of the discharged homogeneous cheese mass packed in 8 ounce plastic tubs for further cooling in a 40° F. cooler. The melt properties of the treated and untreated UF cheese were measured and are shown in Table 10.

TABLE 10

| UF CHEESE | COMPOSITION | | | MELT CHARACTERISTICS | | | |
|---|---|---|---|---|---|---|---|
| | | | | SCHREIBER | | METTLER | FNS |
| (RUBIN et al.) SAMPLE 9 | % MOISTURE | % FAT | % SALT | MELT SCORE | MELT VALUE | MELT TEMP. | MELT SCORE |
| Untreated | 44.93 | 30.5 | 1.26 | 1 | 1.00 | Not melted at 230° F. | Poor |
| Treated | 44.62 | 30.5 | 1.36 | 1+ | 1.14 | Not melted at 230° F. | Poor |

Again, the above process treatment interestingly did not improve the melt properties of the Sample 9 UF cheese made according to the Rubin et al. process.

Applicants have speculated why the UF cheese of Samples 8 and 9 was not converted to a cheese with excellent melt properties, whereas the UF cheese of Samples 6, 7 and 10, when treated, produced a cheese with excellent melt properties. One difference between the samples is that the casein in Samples 8 and 9 had not been treated with rennet, while the casein in Samples 6, 7 and 10 had all undergone a rennet treatment step. The rennet treatment step converts casein to paracasein. In the paracasein form, the casein molecules are more hydrophobic. It is believed that in this form it is easier for the casein molecules to form a continuous protein phase than it is for the non-renneted casein molecules to do so. In this regard, it is believed that treatment with any milk clotting enzyme, including microbial rennet, during the UF cheese manufacturing process will be useful to make the UF cheese one that can be processed into a natural cheese with good melt properties.

EXPERIMENTS/EXAMPLES 8–13

Six experiments/examples were run where a UF cheese was mixed with a conventional cheese and treated to low shear, low temperature mixing and rapid cooling to form finished products with acceptable melt performance.

In each experiment/example, conventional cheese and UF cheese were mixed in a variety of ratios, usually ranging from 100/0 to 0/100 in ten percent increments Pre-calculated amounts of water and salt were added to the cheese blend to target a finished cheese having a composition comparable to a conventional cheese. In each experiment/example, the mixture blend was gradually heated to 145° F, inside a 10 pound size Rietz cooker with steam jacket heating and continuous auger mixing at 90 rpm. As soon as all the released oil incorporated back into the cheese mass and a shiny, smooth, homogeneous cheese mass formed, the cheese was discharged and packed in 8 ounce plastic tubs for fast cooling in a 40° F. cooler.

The sample cheeses used in the experiment/examples were as follows:

| Experiment/Example | Conventional Cheese | UF Cheese |
|---|---|---|
| 8 | Sample 2 | Sample 6 |
| 9 | Sample 2 | Sample 7 |
| 10 | Sample 2 | Sample 8 |
| 11 | Sample 2 | Sample 9 |
| 12 | Sample 4 | Sample 10 |
| 13 | Sample 5 | Sample 10 |

The water content and melt characteristics of the untreated starting materials and each of the treated finished products (including treated 100% conventional cheese and treated 100% UF cheese) are shown in Tables 11–16 below.

TABLE 11

| | | MELT CHARACTERISTICS | | |
|---|---|---|---|---|
| EXPERIMENT/ EXAMPLE 8 | % H₂O | SCHREIBER MELT SCORE | METTLER MELT VALUE | METTLER MELT TEMP. | FNS MELT SCORE |
| Sample 2 Cheddar Block | 37.23 | 4 | 2.32 | 147° F. | Exc. |
| Sample 6 Yee et al. UF cheese | 27.32 | 1 | 1.19 | Not melted at 230+° F. | Poor |
| SAMPLE 2/SAMPLE 6 RATIO | | | | | |
| 100/0 | 37.88 | 4– | 2.07 | 149° F. | Exc. |
| 90/10 | 37.60 | 4– | 2.34 | 149° F. | Exc. |
| 80/20 | 37.31 | 4+ | 2.81 | 166° F. | Exc. |
| 70/30 | 37.29 | 4+ | 2.70 | 157° F. | Exc. |
| 60/40 | 37.14 | 4– | 2.44 | 158° F. | Exc. |
| 50/50 | 37.22 | 3+ | 2.23 | 134° F. | Exc. |
| 40/60 | 37.09 | 4– | 2.34 | 166° F. | Exc. |
| 30/70 | 36.89 | 4– | 2.15 | 151° F. | Exc. |
| 20/80 | 37.11 | 3+ | 1.97 | 164° F. | Exc. |
| 10/90 | 37.57 | 3– | 1.68 | 177° F. | Exc. |
| 0/100 | 37.42 | 3+ | 1.86 | 170° F. | Exc. |

TABLE 12

| EXPERIMENT/ EXAMPLE 9 | % H₂O | MELT CHARACTERISTICS | | | |
|---|---|---|---|---|---|
| | | SCHREIBER MELT SCORE | MELT VALUE | METTLER MELT TEMP. | FNS MELT SCORE |
| Sample 2 Cheddar Block | 37.23 | 4 | 2.32 | 147° F. | Exc. |
| Sample 7 Jameson et al. UF Cheese (w/rennet) | 33.23 | 2+ | 1.55 | Not melted at 230+° F. | Fair |
| SAMPLE 2/SAMPLE 7 RATIO | | | | | |
| 80/20 | 38.38 | 6+ | 3.37 | 143° F. | Exc. |
| 60/40 | 37.48 | 6+ | 3.29 | 149° F. | Exc. |
| 40/60 | 37.22 | 5− | 2.50 | 146° F. | Exc. |
| 20/80 | 36.73 | 4− | 2.01 | 165° F. | Exc. |
| 0/100 | 37.40 | 3+ | 1.81 | 166° F. | Exc. |

TABLE 13

| EXPERIMENT/ EXAMPLE 10 | % H₂O | MELT CHARACTERISTICS | | | |
|---|---|---|---|---|---|
| | | SCHREIBER MELT SCORE | MELT VALUE | METTLER MELT TEMP. | FNS MELT SCORE |
| Sample 2 Cheddar Block | 37.23 | 4 | 2.32 | 147° F. | Exc. |
| SAMPLE 8 Jameson et al. UF Cheese (w/o rennet) | 33.98 | 2 | 1.45 | Not melted at 230+° F. | Fair |
| SAMPLE 2/SAMPLE 8 RATIO | | | | | |
| 100/0 | 37.85 | 4 | 2.35 | 141° F. | Exc. |
| 90/10 | 37.47 | 4− | 2.26 | 144° F. | Exc. |
| 80/20 | 38.26 | 4 | 2.40 | 138° F. | Exc. |
| 70/30 | 37.79 | 4− | 2.32 | 144° F. | Exc. |
| 60/40 | 37.55 | 4− | 2.28 | 156° F. | Exc. |
| 50/50 | 37.43 | 3+ | 1.98 | 159° F. | Exc. |
| 40/60 | 37.33 | 3+ | 1.93 | 170° F. | Exc. |
| 30/70 | 37.12 | 3− | 1.68 | 189° F. | Good |
| 20/80 | 36.67 | 2+ | 1.57 | 179° F. | Good |
| 10/90 | 37.06 | 2+ | 1.47 | 200° F. | Fair |
| 0/100 | 37.08 | 2 | 1.37 | Not melted at 230° F. | Fair |

TABLE 14

| EXPERIMENT/ EXAMPLE 11 | % H₂O | MELT CHARACTERISTICS | | | |
|---|---|---|---|---|---|
| | | SCHREIBER MELT SCORE | MELT VALUE | METTLER MELT TEMP. | FNS MELT SCORE |
| Sample 2 Cheddar Block | 37.23 | 4 | 2.32 | 147° F. | Exc. |
| Sample 9 Rubin et al. UF Cheese | 44.93 | 1 | 1.00 | Not melted at 230+° F. | Poor |
| SAMPLE 2/SAMPLE 9 RATIO | | | | | |
| 100/0 | 44.41 | 5 | 2.73 | 125° F. | Exc. |
| 90/10 | 44.17 | 3+ | 2.15 | 128° F. | Exc. |
| 80/20 | 43.98 | 3 | 1.76 | 132° F. | Exc. |
| 70/30 | 43.96 | 3 | 1.70 | 139° F. | Exc. |
| 60/40 | 44.21 | 2+ | 1.49 | 146° F. | Exc. |
| 50/50 | 44.18 | 2− | 1.38 | 154° F. | Good |
| 40/60 | 44.29 | 2+ | 1.51 | 172° F. | Good |

TABLE 14-continued

| | | MELT CHARACTERISTICS | | | |
|---|---|---|---|---|---|
| EXPERIMENT/ EXAMPLE 11 | % H₂O | SCHREIBER MELT SCORE | MELT VALUE | METTLER MELT TEMP. | FNS MELT SCORE |
| 30/70 | 44.86 | 2− | 1.23 | 218° F. | Fair |
| 20/80 | 44.60 | 2− | 1.28 | 227° F. | Fair |
| 10/90 | 44.72 | 1+ | 1.87 | 217° F. | Poor |
| 0/100 | 44.62 | 1+ | 1.14 | Not melted at 230° F. | Poor |

TABLE 15

| | | MELT CHARACTERISTICS | | | |
|---|---|---|---|---|---|
| EXPERIMENT/ EXAMPLE 12 | % H₂O | SCHREIBER MELT SCORE | MELT VALUE | METTLER MELT TEMP. | FNS MELT SCORE |
| Sample 4 Low Fat cheddar | 43.85 | 3+ | 2.05 | 154° F. | Exc. |
| Sample 10 Yee et al. UF Low Fat Cheese | 41.08 | 2− | 1.26 | 206° F. | Fair |
| SAMPLE 4/SAMPLE 10 RATIO | | | | | |
| 100/0 | 45.54 | 4− | 2.17 | 152° F. | Exc. |
| 90/10 | 45.37 | 4− | 2.23 | 150° F. | Exc. |
| 80/20 | 45.28 | 4− | 2.17 | 154° F. | Exc. |
| 70/30 | 45.99 | 4+ | 2.42 | 156° F. | Exc. |
| 60/40 | 45.71 | 5− | 2.59 | 158° F. | Exc. |
| 50/50 | 45.53 | 5− | 2.55 | 155° F. | Exc. |
| 40/60 | 45.60 | 4+ | 2.47 | 159° F. | Exc. |
| 30/70 | 45.36 | 4+ | 2.40 | 162° F. | Exc. |
| 20/80 | 45.39 | 4+ | 2.35 | 164° F. | Exc. |
| 10/90 | 45.12 | 3+ | 2.08 | 174° F. | Good |
| 0/100 | 44.52 | 3− | 1.74 | 186° F. | Good |

TABLE 16

| | | MELT CHARACTERISTICS | | | |
|---|---|---|---|---|---|
| EXPERIMENT/ EXAMPLE 13 | % H₂O | SCHREIBER MELT SCORE | MELT VALUE | METTLER MELT TEMP. | FNS MELT SCORE |
| Sample 5 Low Moisture, Part Skim Mozzarella | 46.92 | 3+ | 1.97 | 158° F. | Exc. |
| Sample 10 Yee et al. UF Low Fat Cheese | 41.08 | 2− | 1.26 | 206° F. | Fair |
| SAMPLE 5/SAMPLE 10 RATIO | | | | | |
| 100/0 | 46.95 | 4− | 2.19 | 167° F. | Exc. |
| 90/10 | 47.47 | 4 | 2.44 | 164° F. | Exc. |
| 80/20 | 47.59 | 4− | 2.16 | 167° F. | Exc. |
| 70/30 | 47.41 | 4− | 2.14 | 166° F. | Exc. |
| 60/40 | 47.60 | 3+ | 1.93 | 162° F. | Exc. |
| 50/50 | 47.44 | 4− | 2.20 | 166° F. | Exc. |
| 40/60 | 47.65 | 4− | 2.18 | 168° F. | Exc. |
| 30/70 | 47.70 | 4+ | 2.54 | 174° F. | Exc. |
| 20/80 | 47.81 | 3+ | 1.98 | 179° F. | Good |
| 10/90 | 47.70 | 4+ | 2.40 | 180° F. | Good |
| 0/100 | 47.61 | 5− | 2.65 | 180° F. | Good |

Experiments/Examples 8-13 show that blends of UF cheese and conventional cheese can be made that will have acceptable melt properties This was a surprising result because prior to the invention it was thought that the non-melting properties of UF cheese would overshadow the melt properties of conventional cheese in a blend of conventional and UF cheese. Further, as can be seen from Tables II, 13 and 15, in many instances the melt properties of the blends is better than would have been expected even in view of the fact that 100% UF cheese can be processed to have good melt properties.

Where the UF cheese is one that has been prepared with a rennet treatment step, any ratio of UF cheese to conventional cheese can still be processed by the present invention to provide a cheese with a Schreiber melt test value of about 1.75 or above and Mettler melt temperature of less than 200° F. See Tables 11-12 and 15-16. However, even if the UF cheese is one that does not, by itself, result in a cheese with acceptable melt properties by being treated to low shear, low temperature mixing followed by fast cooling, the UF cheese may be blended with conventional cheese and the resulting cheese will have acceptable melt properties. For example, a ratio of 40/60 Sample 2 Cheddar cheese/Sample 8 UF cheese (made by the Jameson et al. process without rennet treatment) was processed to produce a cheese with a melt value of 1.93 and Mettler melt temperature of 170° F. (Table 13). A similar 40/60 ratio using Sample 9 Rubin et al. UF cheese did not have an acceptable Schreiber melt value, but had a Mettler melt temperature below 200° F. and a FNS melt score of "good" (Table 14). By increasing the ratio to 80/20 conventional/UF cheese, a product was obtained with a Schreiber melt score of 3, a melt value of 1.76, a Mettler melt temperature of 132° F. and an "excellent" FNS melt score (Table 14). Thus the present invention provides a process for making any UF cheese into a natural cheese having acceptable melt properties while still having increased levels of whey proteins compared to conventional cheese.

There are some other benefits of blending conventional and UF cheeses. One problem with UF cheese is that it does not develop aged cheese flavor typical of aged conventional cheese By making a blend of conventional and UF cheeses, a natural cheese with substantial amounts of whey proteins can be prepared that will have the characteristics of an aged cheese, primarily an aged cheese flavor. Most importantly, such a blended product can be provided with acceptable melt properties. Blending a UF and conventional cheese also allows a processor to control the melt properties of the resulting natural cheese, as well as its composition and flavor.

In the preferred embodiments of the blending process of the present invention, the ratio of UF to conventional cheeses will be between 10/90 and 90/10, and more preferably between 30/70 and 70/30, and most preferably between 60/40 and 40/60. A preferred embodiment of the invention uses 60% Cheddar cheese and 40% UF cheese in the blend.

The present invention is well suited to making low fat cheese (having a fat content of less than 15% by weight of the cheese) and a very low fat cheese (having less than 1.76% fat), which meets the proposed FDA guidelines for labeling a product as a "zero-fat" product. Also, the product can be made with low sodium levels since no emulsifying agents are needed.

While the examples show a blend of one UF cheese and one conventional cheese, it is contemplated that more than one of either or both types of cheeses can be used in the blends of the present invention Likewise, where the process of the present invention is used to make a cheese with acceptable melt properties from 100% UF cheese, that UF cheese may comprise more than one UF cheese.

The cheeses of the present invention will preferably have a whey proteins to casein ratio, by weight, of at least 1:16, and more preferably at least 1:8, which is generally equivalent to a cheese containing 2% whey proteins. Where all of the whey proteins in the original milk are recovered in making a UF cheese, and only that cheese is used to make cheese of the present invention, the resulting cheese will have a whey proteins to casein ratio of about 1:4.

The cheese of the present invention will preferably be free of emulsifying agents, although this is generally a function of food-labeling laws. Low amounts of emulsifying agents (less than 1% and preferably less than 0.5%) may be added to the product without negatively effecting its properties, although it is emphasized that the product can be made substantially free of emulsifying agents (less than 0.2%) and most preferably will be free of emulsifying agents so that the product can be marketed as a natural cheese.

One of the main benefits of the invention is that it can be used to produce non-pasta filata-type cheeses, particularly American-type cheese, containing whey proteins and casein at a weight ratio of at least 1:16 whey proteins to casein, and still have a melt value of at least 1.75 and a Mettler melt temperature of less than 200° F. Such a product could not be made prior to the present invention. Also, the cheese can be made without first separating and denaturing the whey proteins, as occurs with the process of U.S. Pat. No. 4,919,943. It is believed that the invention is particularly susceptible to being carried out in a continuous process, which would make it even more economical. Also, the process could then beneficially be coupled with a continuous UF cheese making process.

The temperature to which the cheese is heated is generally lower than the temperature used to make pasteurized process cheese (165° F.-185° F.). Generally temperatures of 125° F. and above are suitable, and temperatures less than 165° F. are preferred. The mixing temperature will preferably be in the range of 130° F. to 155° F., with 140° F. to 150° F. being most preferred. Since cheese properties are affected by holding times as well as maximum temperatures, if higher temperatures are used the product should be quickly cooled.

It is believed that during the low temperature mixing of the present invention, the whey proteins are not denatured to any significant extent. Therefore, most, if not all, of the whey proteins in the products of the present invention will preferably be undenatured.

While the preferred process, as in the examples, involves simultaneous heating and mixing, it is possible to devise systems wherein the cheese can be uniformly heated without mixing (such as by microwave) and then the heating and mixing steps can occur sequentially. The mixing step preferably uses low shear, preferably equivalent to a Rietz cooker auger screw tip velocity of less than 100 ft./min.

In the preferred embodiment of the process, the product is cooled at a rate such that the temperature at the core of the cheese drops to a temperature of 120° F. in less than one hour, and to a temperature of 100° F. in less than three hours. One way to achieve a very fast cooling rate is to cast the heated, mixed cheese into a thin layer on a casting line, as is conventional when making individually wrapped slices of processed cheese. In this way, individual wrapped slices of natural cheese, with good melt properties, can be easily produced. The natural cheese of the present invention also has the advantage that it can be shaped and molded during the processing to any desired form.

The shear rate during mixing, the temperature to which the material is heated and the rate of cooling all affect the melt properties of the cheese. These conditions should be chosen such that, in conjunction with the whey proteins level in the product, the resulting cheese has a Schreiber melt test value of at least 1.75 and a Mettler melt temperature below 200° F. The whey proteins level in the product will be a function of the whey proteins level in the UF cheese, or, where a blend is made, of the ratio of cheeses in the blend and the level of whey proteins in the cheeses used in the blend.

It is contemplated that the present invention will be used to produce natural cheese that has the same composition as conventional cheese, primarily so that it can be sold in accordance with FDA Standards of Identity requirements. While the examples have used Cheddar and Mozzarella cheeses, it is also believed that Brick, Edam, Gouda, Swiss and Muenster cheeses could also be made using the invention.

As shown in some of the examples, if the UF cheese has a lower moisture content than the conventional cheese being targeted, water can be added during the mixing step to produce a natural cheese having a moisture content matching that of a conventional cheese. In some instances, salt may also need to be added to produce a product comparable to the conventional cheese. One preferred method of adding moisture is to use direct steam injection, which will also heat the cheese being processed.

It should be appreciated that the products and methods of the present invention are capable of being incorporated in the form of a variety of embodiments, only a few of which have been illustrated and described. For example, instead of using UF cheeses made from milk, it is contemplated that cheeses produced from a feedstock having the ingredients desired in cheese, but not made by ultrafiltration and diafiltration, could also be used in the present invention. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A cheese composition free of emulsifying agents and comprising undenatured whey proteins and casein, and having a whey proteins to casein weight ratio of at least 1:16, a Schreiber melt test value of at least 1.75 and a Mettler melt temperature of less than 200° F.

2. The cheese of claim 1 wherein the cheese also has a FNS melt test score of at least "good".

3. The cheese of claim 1 wherein the cheese is an American-type cheese.

4. The cheese of claim 1 wherein the cheese is a pasta filata-type cheese.

5. The cheese of claim 1 wherein the cheese has a fat content of less than 15% by weight of the cheese.

6. The cheese of claim 1 wherein the cheese has a fat content of less than 1.76% by weight of the cheese.

7. The cheese composition of claim 1 wherein the cheese composition comprises a cheese prepared by ultrafiltration of milk which contains substantially all of the whey proteins originally present in the milk.

8. A cheese composition containing a blend of one or more conventional cheeses and one or more cheeses containing whey proteins and casein at a weight ratio of at least 1:8 whey proteins to casein, the composition comprising whey proteins and casein at a weight ratio of at least 1:16 whey proteins to casein, the composition being free of emulsifying agents and having a Schreiber melt test value of at least 1.75 and a Mettler melt temperature of less than 200° F.

9. The cheese composition of claim 8, wherein the one or more cheeses containing whey proteins and casein at a weight ratio of at least 1:8 whey proteins to casein are prepared by ultrafiltration of milk and contain substantially all of the whey proteins originally present in the milk.

10. An American-type cheese containing casein and at least one-sixteenth as much whey proteins, by weight, as the casein, the cheese being free of emulsifying agents and having a Schreiber melt test value of at least 1.75 and a Mettler melt temperature of less than 200° F.

11. The American-type cheese of claim 10 wherein the whey proteins to casein ratio is at least 1:8.

12. The American-type cheese of claim 10 wherein the whey proteins to casein ratio is about 1:4.

13. The American-type cheese of claim 10 wherein the cheese has a fat content of less than 15% by weight of the cheese.

14. The American-type cheese of claim 10 wherein the cheese has a fat content of less than 1.76% by weight of the cheese.

15. The American-type cheese of claim 10 comprising a cheese prepared by ultrafiltration of milk which contains substantially all of the whey proteins originally present in the milk.

16. A cheese comprising undenatured whey proteins and casein, and having a whey proteins to casein weight ratio of at least 1:16 and a microstructure with a substantially continuous protein phase.

17. The cheese of claim 16 wherein the cheese has a Schreiber melt test value of at least 1.75 and a Mettler melt temperature of less than 200° F.

18. The cheese of claim 16 comprising a cheese prepared by ultrafiltration of milk which contains substantially all of the whey proteins originally present in the milk.

19. A process for converting a cheese with poor melt characteristics to a cheese with good melt characteristics comprising the steps of:
   a) providing a cheese comprising whey protein and casein at a ratio of at least 1:16 whey proteins to casein, said cheese having a Schreiber melt test value of less than 1.75 and a Mettler melt temperature of over 200° F.;
   b) heating said cheese to a temperature above 125° F.;
   c) mixing said cheese in the absence of emulsifying agents until a homogeneous cheese mass is obtained; and
   d) cooling said heated, mixed cheese, thereby producing a cheese with a Schreiber melt test value of at least 1.75 and a Mettler melt temperature of less than 200° F.

20. The process of claim 19 wherein the cooling step takes place such that the temperature at the core of the cooling cheese drops to 120° F. in less than one hour.

21. The process of claim 19 wherein the casein in the cheese is rennet treated.

22. The process of claim 19 wherein the cheese contains at least 2% whey proteins by weight of the cheese.

23. The process of claim 19 wherein the steps of mixing and heating occur simultaneously.

24. The process of claim 19 wherein the heating step is limited to a temperature of less than 165° F.

25. The process of claim 19 wherein the mixing step uses mixing at an auger screw tip velocity of 137 ft/min. or less.

26. The process of claim 19 wherein the cheese has a fat content of less than 15% by weight of the cheese.

27. The process of claim 19 wherein the cheese has a fat content of less than 1.76% by weight of the cheese.

28. The process of claim 19 wherein said cheese with poor melt characteristics is prepared by ultrafiltration of milk and contains substantially all of the whey proteins originally present in the milk.

29. A process for making a cheese with a higher level of whey proteins than in conventional cheese and having good melt properties comprising the steps of:
   a) providing one or more first cheeses containing a weight ratio of less than 1:40 whey proteins to casein and one or more second cheeses containing whey proteins and casein at a weight ratio of at least 1:16 whey proteins to casein;
   b) mixing said first and second cheeses in the absence of emulsifying agents while heating said mixture;
   c) cooling said mixture to form said cheese;
   d) the ratio of said first and second cheeses, the shear conditions during mixing, the temperature of heating and the rate of cooling of the mixture being sufficient to produce a cheese with a Schreiber melt test value of at least 1.75 and a Mettler melt temperature of less than 200° F.

30. The process of claim 29 wherein the whey proteins content of, and ratio of, the first and second cheeses results in the cheese having a whey proteins to casein ratio of at least 1:16.

31. The process of claim 29 wherein the mixture is heated to a temperature in the range of about 125° F. to about 165° F.

32. The process of claim 29 wherein the ratio of first and second cheeses in the mixture is between about 90:10 and about 10:90 first cheeses to second cheeses.

33. The process of claim 29, wherein water is added to the mixture of the first and second cheeses.

34. The process of claim 33 wherein the heating and water addition steps are performed by injecting steam into cheeses while mixing them.

35. The process of claim 29 wherein salt is added to the mixture of first and second cheeses.

36. The process of claim 29 wherein the one or more second cheeses are prepared by ultrafiltration of milk and the one or more second cheeses contain substantially all of the whey proteins originally present in the milk.

37. A process for producing a cheese with a higher level of whey proteins than conventional cheese and having good melt properties comprising the steps of:
   a) providing a cheese with a ratio of whey proteins to casein of at least 1:16, said cheese having a discrete protein microstructure;
   b) modifying the microstructure of the cheese proteins by heating and mixing the cheese such that the proteins form a continuous phase structure, the resulting cheese having a Schreiber melt test value of at least 1.75 and a Mettler melt temperature of less than 200° F.

38. The process of claim 37 wherein the cheese provided in step a) is prepared by ultrafiltration of milk and contains substantially all of the whey proteins originally present in the milk.

* * * * *

UNITED STATES PATENT AND TRADEMARK OFFICE
CERTIFICATE OF CORRECTION

PATENT NO. : 5,750,177
DATED : May 12, 1998
INVENTOR(S) : Jeng-Jung Yee et al.

It is certified that error appears in the above-identified patent and that said Letters Patent is hereby corrected as shown below:

Claim 34,
Line 2, after "into" insert -- the --.

Signed and Sealed this

Eleventh Day of December, 2001

Attest:

NICHOLAS P. GODICI
Attesting Officer   Acting Director of the United States Patent and Trademark Office